(12) United States Patent
Park et al.

(10) Patent No.: US 9,090,767 B2
(45) Date of Patent: Jul. 28, 2015

(54) POLYCARBONATE RESIN COMPOSITION AND MOLDED PRODUCT USING THE SAME

(71) Applicant: Cheil Industries Inc., Gumi-si (KR)

(72) Inventors: Jung-Eun Park, Uiwang-si (KR); Doo-Han Ha, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 127 days.

(21) Appl. No.: 13/866,202

(22) Filed: Apr. 19, 2013

(65) Prior Publication Data

US 2013/0231414 A1 Sep. 5, 2013

Related U.S. Application Data

(63) Continuation-in-part of application No. PCT/KR2010/009029, filed on Dec. 16, 2010.

(30) Foreign Application Priority Data

Oct. 22, 2010 (KR) .................. 10-2010-0103489

(51) Int. Cl.
| | | |
|---|---|---|
| C08L 51/00 | (2006.01) | |
| C08L 69/00 | (2006.01) | |
| C08L 55/02 | (2006.01) | |

(52) U.S. Cl.
CPC ............... C08L 51/003 (2013.01); C08L 69/00 (2013.01); *C08L 55/02* (2013.01); *C08L 2205/02* (2013.01); *C08L 2207/53* (2013.01)

(58) Field of Classification Search
CPC ... C08L 51/003; C08L 69/00; C08L 2205/02; C08L 55/02; C08L 2207/53
USPC .............................. 523/122; 524/504; 525/67
See application file for complete search history.

(56) References Cited

U.S. PATENT DOCUMENTS

| | | | |
|---|---|---|---|
| 4,677,162 A | 6/1987 | Grigo et al. | |
| 5,026,777 A | 6/1991 | Jalbert et al. | |
| 5,580,924 A | 12/1996 | Wildi et al. | |
| 7,498,383 B2 | 3/2009 | Chen et al. | |
| 7,563,846 B2 | 7/2009 | Chen et al. | |
| 2007/0135570 A1 | 6/2007 | Krishnamurthy et al. | |
| 2008/0108751 A1 | 5/2008 | Rogunova et al. | |
| 2010/0331475 A1 | 12/2010 | Hong et al. | |

FOREIGN PATENT DOCUMENTS

| | | |
|---|---|---|
| KR | 10-1992-7001352 A | 8/1992 |
| KR | 10-1993-0017975 A | 9/1993 |
| KR | 10-1996-7001953 A | 3/1996 |
| KR | 10-2002-0035397 A | 5/2002 |
| KR | 10-2005-0082470 A | 8/2005 |
| KR | 10-0666797 B1 | 1/2007 |
| KR | 10-0680338 B1 | 2/2007 |
| KR | 10-2007-0069349 A | 7/2007 |
| KR | 10-2008-0025031 A | 3/2008 |
| KR | 10-2008-0025032 A | 3/2008 |
| KR | 10-2008-0045798 A | 5/2008 |
| KR | 10-2008-0079649 A | 9/2008 |
| KR | 10-2008-0080116 A | 9/2008 |
| KR | 10-2009-0072345 A | 7/2009 |
| KR | 10-2009-0073978 A | 7/2009 |
| KR | 10-2009-0081176 A | 7/2009 |
| KR | 10-2009-0086204 A | 8/2009 |
| WO | 91/07466 A1 | 5/1991 |
| WO | 94/24210 A1 | 10/1994 |
| WO | WO 9965991 A1 * | 12/1999 |
| WO | 2012/053698 A1 | 4/2012 |

OTHER PUBLICATIONS

International Search Report in counterpart International Application No. PCT/KR2010/009029 dated Nov. 21, 2011, pp. 1-4.

\* cited by examiner

*Primary Examiner* — Kriellion Sanders

(74) *Attorney, Agent, or Firm* — Additon, Higgins & Pendleton, P.A.

(57) ABSTRACT

Provided are a polycarbonate resin composition that includes (A) a polycarbonate resin, (B) a first rubber modified vinyl-based graft copolymer including a first rubber having an average particle diameter of about 6 to about 20 μm and a span of about 0.8 to about 2.8 and (C) a second rubber modified vinyl-based graft copolymer including a second rubber having an average particle diameter of about 0.1 to about 0.5 μm, and a molded product using the same.

13 Claims, 1 Drawing Sheet

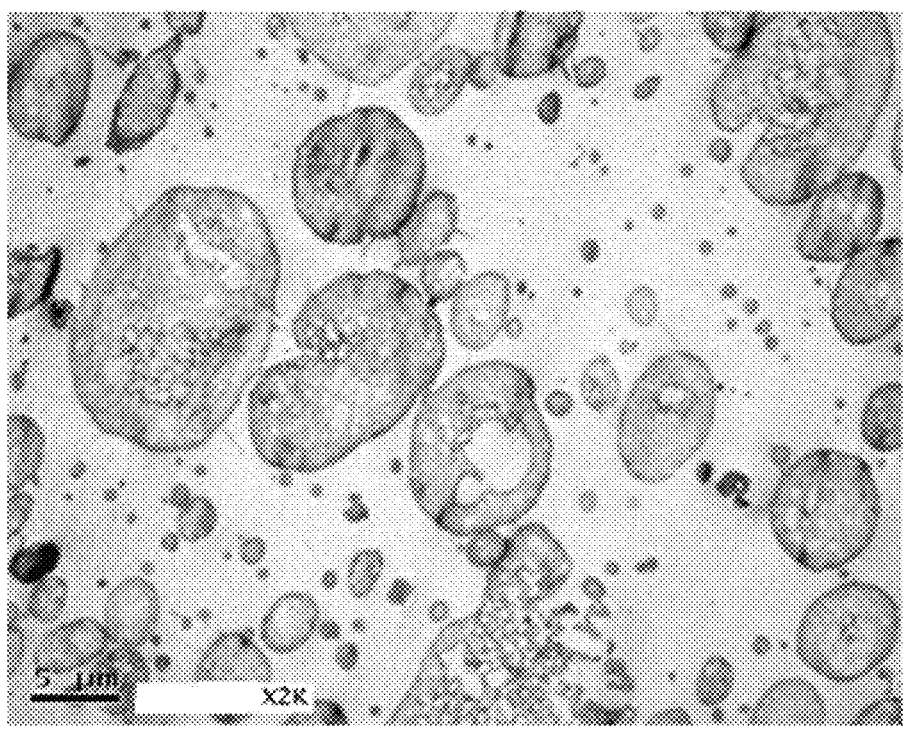

POLYCARBONATE RESIN COMPOSITION AND MOLDED PRODUCT USING THE SAME

CROSS-REFERENCE TO RELATED APPLICATIONS

This application is a continuation-in-part of International Application No. PCT/KR2010/009029, filed Dec. 16, 2010, pending, which designates the U.S., published as WO 2012/053698, and is incorporated herein by reference in its entirety, and claims priority therefrom under 35 USC Section 120. This application also claims priority under 35 USC Section 119 from Korean Patent Application No. 10-2010-0103489, filed Oct. 22, 2010, the entire disclosure of which is also incorporated herein by reference.

FIELD

This disclosure relates to a polycarbonate resin composition and a molded product using the same.

BACKGROUND

Blends of a polycarbonate resin and an acrylonitrile-butadiene-styrene (ABS) resin can have excellent impact resistance, heat resistance, and workability and high gloss and thus are widely used for auto parts, computer housings, office supply equipment, and the like.

Recently, a low gloss material rather than a high gloss material has become popular for auto parts and the like. However, the low gloss material needs an additional painting process, which can increase cost and cause environmental problems. Accordingly, there has been research directed to lowering the gloss of a resin itself.

SUMMARY

The present invention provides a polycarbonate resin composition that can have excellent impact resistance and low gloss.

The present invention also provides a molded product using the polycarbonate resin composition.

According to exemplary embodiments, a polycarbonate resin composition includes (A) a polycarbonate resin; (B) a first rubber modified vinyl-based graft copolymer including a first rubber having an average particle diameter of about 6 to about 20 μm and a span of about 0.8 to about 2.8; and (C) a second rubber modified vinyl-based graft copolymer including a second rubber having an average particle diameter of about 0.1 to about 0.5 μm.

The polycarbonate resin composition may include about 40 to about 80 wt % of the polycarbonate resin (A); about 10 to about 50 wt % of the first rubber modified vinyl-based graft copolymer (B); and about 1 to about 10 wt % of the second rubber modified vinyl-based graft copolymer (C).

The average particle diameter of the first rubber may range from about 11 to about 20 μm, and the average particle diameter of the second rubber may range from about 0.1 to about 0.4 μm.

The first rubber modified vinyl-based graft copolymer may include a copolymer including about 70 to about 97 wt % of a first vinyl-based polymer grafted on about 3 to about 30 wt % of a first rubber, and the second rubber modified vinyl-based graft copolymer may include a copolymer including about 20 to about 70 wt % of a second vinyl-based polymer grafted on about 30 to about 80 wt % of a second rubber.

The first rubber modified vinyl-based graft copolymer may be manufactured by continuous bulk polymerization, continuous solution polymerization or a combination thereof, and the second rubber modified vinyl-based graft copolymer may be manufactured by emulsion polymerization, suspension polymerization, bulk polymerization, or a combination thereof.

The polycarbonate resin composition may further include about 1 to about 5 parts by weight of a vinyl-based copolymer (D) based on about 100 parts by weight of the polycarbonate resin composition.

The vinyl-based copolymer may be a copolymer of about 60 to about 95 wt % of an aromatic vinyl compound and about 5 to about 40 wt % of a vinyl cyanide compound.

The weight average molecular weight of the vinyl-based copolymer may range from about 150,000 to about 500,000 g/mol.

The polycarbonate resin composition may further include an additive including an antibacterial agent, a heat stabilizer, an antioxidant, a release agent, a light stabilizer, an inorganic material additive, a surfactant, a coupling agent, a plasticizer, an admixture, a stabilizer, a lubricant, an anti-static agent, a coloring aid, a flame proofing agent, a weather-resistance agent, a colorant, an ultraviolet (UV) absorber, an ultraviolet (UV) blocking agent, a flame retardant, a filler, or a combination thereof.

A molded product using the polycarbonate resin composition is also provided.

Hereinafter, further embodiments will be described in detail.

The polycarbonate resin composition can have low gloss as well as excellent impact resistance and thus may be used in the manufacture of molded products for various electronic parts, auto parts, miscellaneous goods, and the like.

BRIEF DESCRIPTION OF THE DRAWING

FIG. 1 is a transmission electron microscope (TEM) photograph showing a first rubber modified vinyl-based graft copolymer according to Example 1.

DETAILED DESCRIPTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a specific definition is not otherwise provided, the term "substituted" may refer to one substituted with substituent including halogen (F, Cl, Br, I), a hydroxy group, C1 to C20 alkoxy, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid group or a salt thereof, C1 to C20 alkyl, C2 to C20 alkenyl, C2 to C20 alkynyl, C6 to C30 aryl, C3 to C20 cycloalkyl, C3 to C20 cycloalkenyl, C3 to C20 cycloalkynyl, C2 to C20 heterocycloalkyl, C2 to C20 heterocycloalkenyl, C2 to C20 heterocycloalkynyl, C3 to C30 heteroaryl, or a combination thereof, instead of at least one hydrogen.

As used herein, when a specific definition is not otherwise provided, the term "hetero" may refer to one including at least one or more heteroatoms including N, O, S, P, or a combination thereof in a ring.

As used herein, when a specific definition is not otherwise provided, the term "(meth)acrylate" may refer to "acrylate" and "methacrylate".

A polycarbonate resin composition according to one embodiment includes (A) a polycarbonate resin, (B) a first rubber modified vinyl-based graft copolymer including a first rubber having an average particle diameter of about 6 to about 20 μm and a span of about 0.8 to about 2.8 and (C) a second rubber modified vinyl-based graft copolymer including a second rubber having an average particle diameter of about 0.1 to about 0.5 μm, wherein the first rubber modified vinyl-based graft copolymer (B) includes a rubber with an average particle diameter that is different from the average particle diameter of the rubber of the second rubber modified vinyl-based graft copolymer (C).

A measurement of the average particle diameter is based on volume based particle size.

Each component included in the polycarbonate resin composition according to embodiments will hereinafter be described in detail.

(A) Polycarbonate Resin

The polycarbonate resin may be prepared by reacting one or more diphenols of the following Formula 1 with a compound selected from phosgene, halogenate ester, carbonate ester, or a combination thereof.

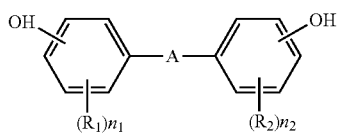

[Chemical Formula 1]

In the above Chemical Formula 1,

A is a single bond, substituted or unsubstituted linear or branched C1 to C30 alkylene, substituted or unsubstituted C2 to C5 alkenylene, substituted or unsubstituted C2 to C5 alkylidene, substituted or unsubstituted linear or branched C1 to C30 haloalkylene, substituted or unsubstituted C5 to C6 cycloalkylene, substituted or unsubstituted C5 to C6 cycloalkenylene, substituted or unsubstituted C5 to C10 cycloalkylidene, substituted or unsubstituted C6 to C30 arylene, substituted or unsubstituted linear or branched C1 to C20 alkoxylene, a halogenate ester group, a carbonate ester group, CO, S, or $SO_2$, $R_1$ and $R_2$ are the same or different and are each independently substituted or unsubstituted C1 to C30 alkyl or substituted or unsubstituted C6 to C30 aryl, and $n_1$ and $n_2$ are the same or different and are each independently integers ranging from 0 to 4.

The diphenols represented by the above Chemical Formula 1 may be used in combinations to constitute repeating units of the polycarbonate resin. Specific examples of the diphenols may include without limitation hydroquinone, resorcinol, 4,4'-dihydroxydiphenyl, 2,2-bis(4-hydroxyphenyl)propane (referred to as 'bisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like, and combinations thereof. In exemplary embodiments, 2,2-bis(4-hydroxyphenyl)propane, 2,2-bis(3,5-dichloro-4-hydroxyphenyl)propane, and/or 1,1-bis(4-hydroxyphenyl)cyclohexane may be used, for example, 2,2-bis(4-hydroxyphenyl)propane may be most used.

The polycarbonate resin may have an average molecular weight ranging from about 10,000 to about 200,000 g/mol, for example about 15,000 to about 80,000 g/mol, but is not limited thereto.

The polycarbonate resin may be a mixture of copolymers prepared from two or more different diphenols. The polycarbonate resin may be a linear polycarbonate resin, a branched polycarbonate resin, a polyester carbonate copolymer, and the like, or a combination thereof.

The linear polycarbonate resin may include a bisphenol-A based polycarbonate resin. The branched polycarbonate resin may include one produced by reacting a multi-functional aromatic compound such as trimellitic anhydride, trimellitic acid, and the like, with one or more diphenols and a carbonate. The multi-functional aromatic compound may be included in an amount of about 0.05 to about 2 mol % based on the total weight of the branched polycarbonate resin. The polyester carbonate copolymer resin may be prepared by reacting difunctional carboxylic acid with one or more diphenols and carbonate. The carbonate may include diaryl carbonate such as diphenyl carbonate, and ethylene carbonate.

The polycarbonate resin composition may include the polycarbonate resin in an amount of about 40 to about 80 wt %, for example about 50 to about 70 wt %, based on the total amount or weight (100 wt %) of the polycarbonate resin composition. In some embodiments, the polycarbonate resin composition may include the polycarbonate resin in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the polycarbonate resin can be in a range from about any of the foregoing amounts to about any other of the foregoing amounts.

When the polycarbonate resin is included in an amount within the above range, impact strength, heat resistance, workability, and the like may be improved.

(B) First Rubber Modified Vinyl-Based Graft Copolymer

The first rubber modified vinyl-based graft copolymer includes a first vinyl-based polymer that is grafted on a first rubber having an average particle diameter of about 6 to about 20 μm and a span of about 0.8 to about 2.8.

The average particle diameter and span of the first rubber are measured using Mastersizer S Ver.2.14 made by Malvern Instruments Ltd.

Based on the span measurements, a distribution chart of the rubber having an average particle diameter of about 6 to about 20 μm is obtained. The span measurements are calculated according to the following Equation 1.

$$\text{Span} = \{D[v,0.9] - D[v,0.1]\}/D[v,0.5] \qquad [\text{Equation 1}]$$

D[v, 0.1] denotes a diameter at a volume fraction of 0.1.

The first rubber may have an average particle diameter of about 11 to about 20 μm and a span of about 1.2 to about 2.8.

In some embodiments, the first rubber may have an average particle diameter of about 6, 7, 8, 9, 10, 11, 12, 13, 14, 15, 16, 17, 18, 19, or 20 μm. Further, according to some embodiments of the present invention, the first rubber may have an average particle diameter in a range from about any of the foregoing amounts to about any other of the foregoing amounts.

In some embodiments, the first rubber may have a span of about 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7 or 2.8. Further, according to some embodiments of the present invention, the first rubber may have span in a range from about any of the foregoing amounts to about any other of the foregoing amounts.

When the first rubber has an average particle diameter and a span within the above ranges, low gloss as well as excellent impact resistance may be obtained.

Examples of the first rubber may include without limitation butadiene rubbers, acrylic rubbers, ethylene/propylene rubbers, styrene/butadiene rubbers, acrylonitrile/butadiene rubbers, isoprene rubbers, ethylene-propylene-diene terpolymer (EPDM) rubbers, polyorganosiloxane/polyalkyl(meth)acrylate rubber composites, and the like, and combinations thereof.

Examples of the first vinyl-based polymer may include without limitation aromatic vinyl compounds, vinyl cyanide compounds, copolymers of an aromatic vinyl compound and a vinyl cyanide compounds, and the like, and combinations thereof. In exemplary embodiments, a copolymer of an aromatic vinyl compound and a vinyl cyanide compound may be used.

The copolymer of an aromatic vinyl compound and a vinyl cyanide compound may be a copolymer of about 60 to about 90 wt % of the aromatic vinyl compound and about 10 to about 40 wt % of the vinyl cyanide compound.

In some embodiments, the copolymer of an aromatic vinyl compound and a vinyl cyanide compound may include the aromatic vinyl compound in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the aromatic vinyl compound can be in a range from about any of the foregoing amounts to about any other of the foregoing amounts.

In some embodiments, the copolymer of an aromatic vinyl compound and a vinyl cyanide compound may include the vinyl cyanide compound in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the amount of the vinyl cyanide compound can be in a range from about any of the foregoing amounts to about any other of the foregoing amounts.

Examples of the aromatic vinyl compound may include without limitation styrene, C1 to C10 alkyl substituted styrene, halogen substituted styrene, and the like, and combinations thereof. Examples of the alkyl substituted styrene may include without limitation o-ethyl styrene, m-ethyl styrene, p-ethyl styrene, α-methyl styrene, and the like, and combinations thereof.

Examples of the vinyl cyanide compound may include without limitation acrylonitrile, methacrylonitrile, ethacrylonitrile, and the like, and combinations thereof.

The first rubber modified vinyl-based graft copolymer may be a copolymer including about 70 to about 97 wt % of a first vinyl-based polymer grafted on about 3 to about 30 wt % of a first rubber, for example a copolymer including about 70 to about 95 wt % of a first vinyl-based polymer grafted on about 5 to about 30 wt % of a first rubber.

In some embodiments, the first rubber modified vinyl-based graft copolymer may include the first vinyl-based polymer in an amount of about 70, 71, 72, 73, 74, 75, 76, 77, 78, 79, 80, 81, 82, 83, 84, 85, 86, 87, 88, 89, 90, 91, 92, 93, 94, 95, 96, or 97 wt %. Further, according to some embodiments of the present invention, the amount of the first vinyl-based polymer can be in a range from about any of the foregoing amounts to about any other of the foregoing amounts.

In some embodiments, the first rubber modified vinyl-based graft copolymer may include the first rubber in an amount of about 3, 4, 5, 6, 7, 8, 9, 10, 11, 12, 13, 14, 15, 16, 17, 18, 19, 20, 21, 22, 23, 24, 25, 26, 27, 28, 29, or wt %. Further, according to some embodiments of the present invention, the amount of the first rubber can be in a range from about any of the foregoing amounts to about any other of the foregoing amounts.

When the first rubber is included in an amount within the above range, low gloss as well as excellent impact resistance may be obtained.

The first rubber modified vinyl-based graft copolymer may be manufactured by continuous bulk polymerization, continuous solution polymerization or a combination thereof.

The polycarbonate resin composition may include the first rubber modified vinyl-based graft copolymer in an amount of about 10 to about 50 wt % for example, about 20 to about 40 wt %, based on the total amount or weight (100 wt %) of the polycarbonate resin composition. In some embodiments, the polycarbonate resin composition may include the first rubber modified vinyl-based graft copolymer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the first rubber modified vinyl-based graft copolymer can be in a range from about any of the foregoing amounts to about any other of the foregoing amounts.

When the first rubber modified vinyl-based graft copolymer is used in an amount within the above range, excellent reduction effect in gloss may be obtained.

(C) Second Rubber Modified Vinyl-Based Graft Copolymer

The second rubber modified vinyl-based graft copolymer may be prepared by grafting a second vinyl-based polymer on a second rubber having an average particle diameter of about 0.1 to about 0.5 μm.

The average particle diameter of the second rubber may be measured using Mastersizer S Ver.2.14 made by Malvern Instruments Ltd.

The second rubber may have an average particle diameter of about 0.1 to about 0.4 μm.

In some embodiments, the second rubber may have an average particle diameter of about 0.1, 0.2, 0.3, 0.4, or 0.5 μm. Further, according to some embodiments of the present invention, the second rubber may have an average particle diameter in a range from about any of the foregoing amounts to about any other of the foregoing amounts.

When the second rubber has an average particle diameter within the above range, excellent impact resistance may be obtained.

Examples of the second rubber may include without limitation butadiene rubbers, acrylic rubbers, ethylene/propylene rubbers, styrene/butadiene rubbers, acrylonitrile/butadiene rubbers, isoprene rubbers, ethylene-propylene-diene terpolymer (EPDM) rubbers, polyorganosiloxane/polyalkyl(meth)acrylate rubber composites, and the like, and combinations thereof.

Examples of the second vinyl-based polymer may include without limitation aromatic vinyl compounds, vinyl cyanide compounds, copolymers of an aromatic vinyl compound and a vinyl cyanide compound, and the like, and combinations thereof. In exemplary embodiments, a copolymer of an aromatic vinyl compound and a vinyl cyanide compound may be used.

The copolymer of an aromatic vinyl compound and a vinyl cyanide compound may be a copolymer of about 70 to about 80 wt % of the aromatic vinyl compound and about 20 to about 30 wt % of the vinyl cyanide compound.

In some embodiments, the copolymer of an aromatic vinyl compound and a vinyl cyanide compound may include the aromatic vinyl compound in an amount of about 70, 71, 72, 73, 74, 75, 76, 77, 78, 79, or 80 wt %. Further, according to some embodiments of the present invention, the amount of the aromatic vinyl compound can be in a range from about any of the foregoing amounts to about any other of the foregoing amounts.

In some embodiments, the copolymer of an aromatic vinyl compound and a vinyl cyanide compound may include the vinyl cyanide compound in an amount of about 20, 21, 22, 23, 24, 25, 26, 27, 28, 29, or 30 wt %. Further, according to some embodiments of the present invention, the amount of the vinyl cyanide compound can be in a range from about any of the foregoing amounts to about any other of the foregoing amounts.

Examples of the aromatic vinyl compound may include without limitation styrene, C1 to C10 alkyl substituted styrene, halogen substituted styrene, and the like, and combinations thereof. Examples of the alkyl substituted styrene may include without limitation o-ethyl styrene, m-ethyl styrene, p-ethyl styrene, α-methyl styrene, and the like, and combinations thereof.

Examples of the vinyl cyanide compound may include without limitation acrylonitrile, methacrylonitrile, ethacrylonitrile, and the like, and combinations thereof.

The second rubber modified vinyl-based graft copolymer may be a copolymer including about 20 to about 70 wt % of a second vinyl-based polymer grafted on about 30 to about 80 wt % of a second rubber, for example a copolymer including about 40 to about 70 wt % of a second vinyl-based polymer grafted on about 30 to about 60 wt % of a second rubber In some embodiments, the second rubber modified vinyl-based graft copolymer may include the second vinyl-based polymer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the amount of the second vinyl-based polymer can be in a range from about any of the foregoing amounts to about any other of the foregoing amounts.

In some embodiments, the second rubber modified vinyl-based graft copolymer may include the second rubber in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the second rubber can be in a range from about any of the foregoing amounts to about any other of the foregoing amounts.

When the second rubber is used in an amount within the above range, low gloss as well as excellent impact resistance may be simultaneously obtained.

The second rubber modified vinyl-based graft copolymer may be manufactured by emulsion polymerization, suspension polymerization, bulk polymerization, or a combination thereof.

The polycarbonate resin composition may include the second rubber modified vinyl-based graft copolymer in an amount of about 1 to about 10 wt % for example about 1 to about 5 wt %, based on the total amount or weight (100 wt %) of the polycarbonate resin composition. In some embodiments, the polycarbonate resin composition may include the second rubber modified vinyl-based graft copolymer in an amount of about 1, 2, 3, 4, 5, 6, 7, 8, 9, or 10 wt %. Further, according to some embodiments of the present invention, the amount of the second rubber modified vinyl-based graft copolymer can be in a range from about any of the foregoing amounts to about any other of the foregoing amounts.

When the second rubber modified vinyl-based graft copolymer is included in an amount within the above range, low gloss as well as excellent impact resistance may be simultaneously obtained.

(D) Vinyl-Based Copolymer

The polycarbonate resin composition according to one embodiment may further include a vinyl-based copolymer which does not include a rubber component.

The vinyl-based copolymer may be a copolymer of about 60 to about 95 wt % of an aromatic vinyl compound and about 5 to about 40 wt % of a vinyl cyanide compound.

In some embodiments, the vinyl-based copolymer may include the aromatic vinyl compound in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the aromatic vinyl compound can be in a range from about any of the foregoing amounts to about any other of the foregoing amounts.

In some embodiments, the vinyl-based copolymer may include the vinyl cyanide compound in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the amount of the vinyl cyanide compound can be in a range from about any of the foregoing amounts to about any other of the foregoing amounts.

The vinyl-based copolymer may be produced as a byproduct during the manufacture of the first and/or the second rubber modified vinyl-based graft copolymers and particularly, can be produced when an excess amount of a vinyl-based copolymer is grafted on a small amount of a rubber, or when a chain-transfer agent used as a molecular weight controlling agent is used in an excess amount.

The vinyl-based copolymer may be manufactured by emulsion polymerization, suspension polymerization, solution polymerization, massive polymerization, or a combination thereof.

The vinyl-based copolymer may have a weight average molecular weight of about 150,000 to about 500,000 g/mol, for example about 250,000 to about 500,000 g/mol. When the vinyl-based copolymer has a weight average molecular weight within the range, reduction effect in gloss may be obtained.

The polycarbonate resin composition may include the vinyl-based copolymer in an amount of about 1 to about 5 parts by weight, for example about 1 to about 3 parts by weight, based on about 100 parts by weight of the polycarbonate resin composition. In some embodiments, the polycarbonate resin composition may include the vinyl-based copolymer in an amount of about 1, 2, 3, 4, or 5 parts by weight. Further, according to some embodiments of the present invention, the amount of the vinyl-based copolymer can be in a range from about any of the foregoing amounts to about any other of the foregoing amounts.

When the vinyl-based copolymer is used in an amount within the above range, low gloss as well as excellent impact resistance may be obtained.

(E) Additive

The polycarbonate resin composition according to one embodiment may further include one or more additives. Examples of the additives may include without limitation antibacterial agents, heat stabilizers, antioxidants, release agents, light stabilizers, inorganic material additives, surfactants, coupling agents, plasticizers, admixtures, stabilizers, lubricants, anti-static agents, coloring aids, flame proofing agents, weather-resistance agents, colorants, ultraviolet (UV) absorbers, ultraviolet (UV) blocking agents, flame retardants, fillers, and the like, and combinations thereof.

Examples of the antioxidant may include without limitation phenol antioxidants, phosphite antioxidants, thioether antioxidants, amine antioxidants, and the like, and combinations thereof.

Examples of the release agent may include without limitation fluorine-included polymers, silicone oils, metal salts of stearic acid, metal salts of montanic acid, montanic acid ester waxes, polyethylene waxes, and the like, and combinations thereof.

Examples of the weather-resistance agent may include without limitation benzophenone weather-resistance agents, hindered amine weather-resistance agents, and the like, and combinations thereof.

Examples of the colorant may include without limitation dyes, pigments, and the like, and combinations thereof.

Examples of the ultraviolet (UV) blocking agent may include without limitation titanium dioxide ($TiO_2$), carbon black, and the like, and combinations thereof.

Examples of the filler may include without limitation glass fiber, carbon fiber, silica, mica, alumina, clay, calcium carbonate, calcium sulfate, glass bead, and the like, and combinations thereof.

The additive may be included in a predetermined amount as long as it does not deteriorate the properties of the polycarbonate resin composition, for example in an amount of less than or equal to about 30 parts by weight, and as another example in an amount of about 0.1 to about 20 parts by weight, based on about 100 parts by weight of the polycarbonate resin composition.

The polycarbonate resin composition according to one embodiment may be prepared according to known methods for preparing a resin composition. For example, constituent components according to one embodiment and other optional additive(s) may be simultaneously mixed and melt-extruded in an extruder to provide pellets.

According to another embodiment, a molded product is provided that is prepared by molding the polycarbonate resin composition. The molded product may be fabricated using the polycarbonate resin composition according to any conventional processes known in the art such as but not limited to injection molding, blow molding, extrusion molding, thermoforming and the like. The molded product may be used in the manufacture of various electronic parts, auto parts, miscellaneous goods, and the like simultaneously requiring excellent impact resistance and low gloss.

The following examples illustrate the invention in more detail. However, it is understood that this disclosure is not limited by these examples.

EXAMPLES

Each constituent component used for preparing a polycarbonate resin composition according to one embodiment is as follows.

(A) Polycarbonate Resin
SC-1080 made by Cheil Industries Inc. is used.

(B) First Rubber Modified Vinyl-Based Graft Copolymer (B-1) A graft polymerized copolymer is prepared by polymerizing 9 wt % of a butadiene rubber and 91 wt % of a copolymer of styrene and acrylonitrile using a continuous polymerization. As used in this component, the butadiene rubber has an average particle diameter of 14 μm and a span of 1.6.

A transmission electron microscope (TEM) photograph of the copolymer is provided in FIG. 1.

FIG. 1 is transmission electron microscope (TEM) photograph showing the first rubber modified vinyl-based graft copolymer according to Example 1. Referring to FIG. 1, the first rubber has an average particle diameter of about 14 μm.

(B-2) A graft polymerized copolymer is prepared by polymerizing 11 wt % of a butadiene rubber and 89 wt % of a copolymer of styrene and acrylonitrile using a continuous polymerization. As used in this component, the butadiene rubber has an average particle diameter of 5 μm and a span of 1.0.

(B-3) A graft polymerized copolymer is prepared by polymerizing 13 wt % of a butadiene rubber and 87 wt % of a copolymer of styrene and acrylonitrile using a continuous polymerization. As used in this component, the butadiene rubber has an average particle diameter of 10 μm and a span of 3.0.

The average particle diameter and the span of each rubber in the (B-1), (B-2), and (B-3) are measured using Mastersizer S Ver.2.14 made by Malvern Instruments Ltd. The span is calculated according to the following Equation 1.

$$\text{Span} = \{D[v,0.9] - D[v,0.1]\}/D[v,0.5] \quad \text{[Equation 1]}$$

D[v, 0.1] denotes a diameter at a volume fraction of 0.1.

(C) Second Rubber Modified Vinyl-Based Graft Copolymer

An ABS graft copolymer is prepared by polymerizing 58 wt % of a butadiene rubber and 42 wt % of a copolymer of styrene and acrylonitrile using a emulsion polymerization. As used in this component, the butadiene rubber has an average particle diameter of 0.3 μm.

The average particle diameter of the rubber is measured using Mastersizer S Ver.2.14 made by Malvern Instruments Ltd.

(D) Vinyl-Based Copolymer (D-1) A styrene-acrylonitrile copolymer (SAN) resin including 25 wt % of acrylonitrile and having a weight average molecular weight of 400,000 g/mol is used.

(D-2) A SAN resin including 28 wt % of acrylonitrile and having a weight average molecular weight of 90,000 g/mol is used.

(E) Additive

UPN HS-T 0.5 made by Hayashi-Kasei Co., Ltd. as talc is used.

Examples 1 to 4 and Comparative Examples 1 to 6

Each polycarbonate resin composition is prepared according to Examples 1 to 4 and Comparative Examples 1 to 6 using constituent components provided in the following Table 1.

Specifically, each constituent component is mixed according to a composition ratio in the following Table 1, and the mixture is extruded in a conventional twin-screw extruder and formed into a pellet.

Experimental Examples

The specimen pellet is dried at 100° C. for 2 hours and then, injection molded into an ASTM specimen using a 6 oz injection molding machine cylinder and setting its cylinder at 260° C., its molding temperature at 60° C., and the molding cycle for 30 seconds.

The specimen is evaluated for various properties using the following methods. The results are provided in the following Table 1.

(1) IZOD Impact strength (notched): measured in accordance with ASTM D256 (a specimen thickness of 1/8").

(2) Gloss (60°): measured at each injection temperature of 240° C., 260° C., and 280° C. in accordance with ASTM D523 by setting the angle of a BYK-Gardner gloss meter at 60°.

TABLE 1

|  |  | Example | | | | Comparative Example | | | | | |
|---|---|---|---|---|---|---|---|---|---|---|---|
|  |  | 1 | 2 | 3 | 4 | 1 | 2 | 3 | 4 | 5 | 6 |
| (A) polycarbonate resin (wt %) | | 64 | 63 | 59 | 65 | 64 | 64 | 65 | 65 | 65 | 64 |
| (B) first rubber modified vinyl-based graft copolymer | B-1 (wt %) | 31 | 24 | 34 | 30 | 34 | — | — | — | — | — |
|  | B-2 (wt %) | — | — | — | — | — | 29 | — | — | — | — |
|  | B-3 (wt %) | — | — | — | — | — | — | 30 | — | — | — |
| (C) second rubber modified vinyl-based graft copolymer (wt %) | | 3 | 10 | 5 | 5 | — | 5 | 5 | 15 | 15 | 15 |
| (D) vinyl-based copolymer | D-1 (wt %) | 2 | 3 | 2 | — | 2 | 2 | — | — | — | 6 |
|  | D-2 (wt %) | — | — | — | — | — | — | — | 20 | 20 | 15 |
| (E) additive (part by weight*) | | — | — | — | — | — | — | — | 5 | 10 | — |
| IZOD Impact strength (kgf · cm/cm) | | 60 | 68 | 65 | 65 | 40 | 70 | 65 | 42 | 35 | 63 |
| gloss (%) | injection temperature (240° C.) | 20 | 19 | 21 | 23 | 20 | 38 | 35 | 30 | 28 | 22 |
|  | injection temperature (260° C.) | 44 | 42 | 45 | 48 | 41 | 56 | 51 | 48 | 40 | 58 |
|  | injection temperature (280° C.) | 56 | 58 | 56 | 57 | 59 | 73 | 68 | 56 | 53 | 75 |

*part by weight: (A) the polycarbonate resin, (B) the first rubber modified vinyl-based graft copolymer, (C) the second rubber modified vinyl-based graft copolymer, and (D) the vinyl-based copolymer are used in each unit of parts by weight based on the total amount of 100 parts by weight.

Referring to Table 1, the polycarbonate resin compositions including a polycarbonate resin, a first rubber modified vinyl-based graft copolymer including a first rubber having an average particle diameter of about 6 to about 20 μm and a span of about 0.8 to about 2.8, and a second rubber modified vinyl-based graft copolymer including a second rubber having an average particle diameter of about 0.1 to about 0.5 μm according to Examples 1 to 4 have excellent impact resistance and low gloss compared with the ones according to Comparative Examples 1 to 6.

Specifically, the polycarbonate resin composition of Comparative Example 1 which did not include a second rubber modified vinyl-based graft copolymer according to the invention exhibits sharply deteriorated impact resistance. In addition, the polycarbonate resin compositions of Comparative Example 2, which includes a first rubber modified vinyl-based graft copolymer including a first rubber having an average particle diameter outside of the range of about 6 to about 20 μm, and Comparative Example 3, which includes a first rubber modified vinyl-based graft copolymer including a first rubber having a span out of the range of about 0.8 to about 2.8, do not exhibit low gloss. In addition, the polycarbonate resin compositions of Comparative Examples 4 to 6 which do not include a first rubber modified vinyl-based graft copolymer as in the present invention had neither excellent impact resistance nor low gloss.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polycarbonate resin composition, comprising
   (A) a polycarbonate resin;
   (B) a first rubber modified vinyl-based graft copolymer including a first rubber having an average particle diameter of about 6 to about 20 μm and a span of about 0.8 to about 2.8; and
   (C) a second rubber modified vinyl-based graft copolymer including a second rubber having an average particle diameter of about 0.1 to about 0.5 μm,
   wherein the span of the first rubber is measured according to the following Equation 1:

$$\text{Span} = \{D[v, 0.9] - D[v, 0.1]\}/D[v, 0.5], \quad [\text{Equation 1}]$$

wherein D[v, 0.1] denotes a diameter at a volume fraction of 0.1.

2. The polycarbonate resin composition of claim 1, wherein the polycarbonate resin composition comprises:
   about 40 to about 80 wt % of the polycarbonate resin (A);
   about 10 to about 50 wt % of the first rubber modified vinyl-based graft copolymer (B); and
   about 1 to about 10 wt % of the second rubber modified vinyl-based graft copolymer (C).

3. The polycarbonate resin composition of claim 1, wherein an average particle diameter of the first rubber ranges from about 11 to about 20 μm.

4. The polycarbonate resin composition of claim 1, wherein an average particle diameter of the second rubber ranges from about 0.1 to about 0.4 μm.

5. The polycarbonate resin composition of claim 1, wherein the first rubber modified vinyl-based graft copolymer comprises a copolymer including about 70 to about 97 wt % of a first vinyl-based polymer grafted on about 3 to about 30 wt % of a first rubber.

6. The polycarbonate resin composition of claim 1, wherein the second rubber modified vinyl-based graft copolymer comprises a copolymer including about 20 to about 70 wt % of a second vinyl-based polymer grafted on about 30 to about 80 wt % of a second rubber.

7. The polycarbonate resin composition of claim 1, wherein the first rubber modified vinyl-based graft copolymer is manufactured by continuous bulk polymerization, continuous solution polymerization or a combination thereof.

8. The polycarbonate resin composition of claim 1, wherein the second rubber modified vinyl-based graft copolymer is manufactured by emulsion polymerization, suspension polymerization, bulk polymerization, or a combination thereof.

9. The polycarbonate resin composition of claim 1, wherein the polycarbonate resin composition further comprises about 1 to about 5 parts by weight of vinyl-based copolymer (D) based on about 100 parts by weight of the polycarbonate resin composition.

10. The polycarbonate resin composition of claim 9, wherein the vinyl-based copolymer is a copolymer of about 60 to about 95 wt % of an aromatic vinyl compound and about 5 to about 40 wt % of a vinyl cyanide compound.

11. The polycarbonate resin composition of claim 10, wherein a weight average molecular weight of the vinyl-based copolymer ranges from about 150,000 to about 500,000 g/mol.

12. The polycarbonate resin composition of claim 1, wherein the polycarbonate resin composition further comprises an antibacterial agent, a heat stabilizer, an antioxidant, a release agent, a light stabilizer, an inorganic material additive, a surfactant, a coupling agent, a plasticizer, an admixture, a stabilizer, a lubricant, an anti-static agent, a coloring aid, a flame proofing agent, a weather-resistance agent, a colorant, an ultraviolet (UV) absorber, an ultraviolet (UV) blocking agent, a flame retardant, a filler, or a combination thereof.

13. A molded product using the polycarbonate resin composition according to claim 1.

\* \* \* \* \*

UNITED STATES PATENT AND TRADEMARK OFFICE
CERTIFICATE OF CORRECTION

PATENT NO.        : 9,090,767 B2
APPLICATION NO.   : 13/866202
DATED             : July 28, 2015
INVENTOR(S)       : Jung-Eun Park et al.

Page 1 of 1

It is certified that error appears in the above-identified patent and that said Letters Patent is hereby corrected as shown below:

In the Specification

Column 6, Line 6 reads: "17, 18, 19, 20, 21, 22, 23, 24, 25, 26, 27, 28, 29, or wt %."
and should read: "17, 18, 19, 20, 21, 22, 23, 24, 25, 26, 27, 28, 29, or 30 wt %."

Signed and Sealed this
Twenty-first Day of June, 2016

Michelle K. Lee
*Director of the United States Patent and Trademark Office*